(12) United States Patent
Mottet et al.

(10) Patent No.: US 10,018,117 B2
(45) Date of Patent: Jul. 10, 2018

(54) FLUID CIRCUIT IN A TURBINE ENGINE

(71) Applicant: SNECMA, Paris (FR)

(72) Inventors: Lauranne Sophie Mottet, Paris (FR);
Nicolas Potel, Maisons Alfort (FR);
Philippe Vertenoeuil, Paris (FR)

(73) Assignee: SNECMA, Paris (FR)

( * ) Notice: Subject to any disclaimer, the term of this patent is extended or adjusted under 35 U.S.C. 154(b) by 519 days.

(21) Appl. No.: 14/404,151

(22) PCT Filed: May 30, 2013

(86) PCT No.: PCT/FR2013/051221
§ 371 (c)(1),
(2) Date: Nov. 26, 2014

(87) PCT Pub. No.: WO2013/178956
PCT Pub. Date: Dec. 5, 2013

(65) Prior Publication Data
US 2015/0167555 A1   Jun. 18, 2015

(30) Foreign Application Priority Data

Jun. 1, 2012   (FR) .................................. 12 55129

(51) Int. Cl.
*F02C 7/18* (2006.01)
*F01D 25/20* (2006.01)
(Continued)

(52) U.S. Cl.
CPC ............... *F02C 7/18* (2013.01); *F01D 25/18* (2013.01); *F01D 25/20* (2013.01); *F02C 7/14* (2013.01);
(Continued)

(58) Field of Classification Search
CPC .... F02C 7/14; F02C 7/18; F02C 7/224; F01D 25/18; F01D 25/20; F16K 31/1221;
(Continued)

(56) References Cited

U.S. PATENT DOCUMENTS 2,887,060 A * 5/1959 Adams .................... F04C 14/02
137/115.13
3,554,222 A * 1/1971 Kihara .................... F15B 11/05
137/501

(Continued)

FOREIGN PATENT DOCUMENTS

EP      0 307 264      3/1989
FR      1 014 955      8/1952
(Continued)

OTHER PUBLICATIONS

International Search Report dated Sep. 6, 2013 in PCT/FR13/051221 Filed May 30, 2013.

*Primary Examiner* — Phutthiwat Wongwian
*Assistant Examiner* — Loren Edwards
(74) *Attorney, Agent, or Firm* — Oblon, McClelland, Maier & Neustadt, L.L.P.

(57) ABSTRACT

A device for controlling feed of fluid to equipment, such as a heat exchanger, the device including: a fluid slide valve mounted in a fluid circuit including a slide movable between two positions, a first position in which it allows the fluid to flow through the equipment, and a second position in which it prevents the fluid from flowing through the equipment; a laminar flow constriction arranged in the fluid circuit upstream from the slide valve; and a drive mechanism moving the slide of the slide valve between its two positions by head loss of the fluid in the laminar flow constriction.

10 Claims, 2 Drawing Sheets

(51) Int. Cl.
  *F02C 7/14* (2006.01)
  *F02C 7/224* (2006.01)
  *F01D 25/18* (2006.01)
  *F16K 3/00* (2006.01)
  *F16K 31/122* (2006.01)
  *F16K 47/08* (2006.01)
  *G05D 7/01* (2006.01)
  *G05D 16/04* (2006.01)

(52) U.S. Cl.
  CPC ............... *F02C 7/224* (2013.01); *F16K 3/00* (2013.01); *F16K 31/1221* (2013.01); *F16K 47/08* (2013.01); *G05D 7/014* (2013.01); *G05D 16/04* (2013.01); *F05D 2220/32* (2013.01); *F05D 2260/213* (2013.01); *F05D 2260/232* (2013.01); *Y02T 50/671* (2013.01); *Y02T 50/675* (2013.01); *Y10T 137/2605* (2015.04); *Y10T 137/7788* (2015.04)

(58) Field of Classification Search
  CPC ........ F16K 47/08; G05D 7/014; G05D 16/04; Y10T 137/2605; Y10T 137/7788; F05D 2220/32; F05D 2260/232; F05D 2260/213; Y02T 50/671; Y02T 50/675
  USPC ........................................................ 60/39.08
  See application file for complete search history.

(56) References Cited

U.S. PATENT DOCUMENTS

| | | | |
|---|---|---|---|
| 4,041,697 A | | 8/1977 | Coffinberry et al. |
| 4,741,152 A | * | 5/1988 | Burr ........................ F01D 25/18 60/39.08 |
| 4,899,535 A | | 2/1990 | Dehan et al. |
| 5,205,320 A | * | 4/1993 | Nishimura ........... G05D 7/0126 137/312 |

FOREIGN PATENT DOCUMENTS

| | | |
|---|---|---|
| FR | 1 390 562 | 2/1965 |
| GB | 300 245 | 7/1929 |
| GB | 600 552 | 4/1948 |

* cited by examiner

FLUID CIRCUIT IN A TURBINE ENGINE

BACKGROUND OF THE INVENTION

Field of the Invention

The invention relates to a device for controlling the feed of fluid to a piece of equipment such as a heat exchanger, e.g. arranged in a turbine engine.

DESCRIPTION OF THE RELATED ART

In known manner, a turbine engine includes an oil circuit for feeding lubricating oil to equipment such as, in particular, bearings and gearing, and it also includes a fuel circuit feeding injectors mounted in a combustion chamber.

It is known to connect the oil and fuel circuits together via heat exchangers in order to avoid the lubricating oil becoming too hot, the oil being cooled by exchanging heat with the fuel.

For this purpose, a main oil/fuel heat exchanger is used that is arranged in the oil and fuel circuits downstream or upstream from an oil/air heat exchanger mounted in the oil circuit. The oil/air heat exchanger has a stream of air coming from outside the turbine engine passing through it or sweeping over it.

The oil/air heat exchanger is needed to cool the oil when, at certain operating points of the turbine engine, the oil/fuel heat exchanger does not make it possible to cool the oil sufficiently.

Nevertheless, it is preferable for the oil/air heat exchanger not to be in operation throughout the time in which the turbine engine is in use.

Specifically, during takeoff under cold operating conditions that could lead to ice forming in the fuel, it is desirable for the oil to heat the fuel via the main oil/fuel heat exchanger, so the oil should not flow through the oil/air heat exchanger in order to avoid cooling the oil. Likewise, during a cruising stage, the oil temperature must not drop below a threshold value in order to avoid oil being retained in the enclosures of the turbine engine. Thus, in this configuration, it is necessary to prevent the oil from flowing through the oil/air heat exchanger in order to avoid its temperature dropping below the threshold value.

In order to control the flow rate of air passing through the oil/air heat exchanger, it is known to make use of a flap for shutting of the supply of air to the heat exchanger, which flap is controlled electrically by means of an actuator as a function of the temperature of the oil as measured by a sensor. Although that solution is found to be effective, it requires an actuator to be installed together with an electrical control path for the actuator, which path is connected to a full authority digital engine controller (FADEC), and that is penalizing in terms of weight and bulk on the turbine engine. Furthermore, in certain types of engine, the oil/air heat exchanger is installed in the bypass air stream flowing around the engine, and adding a shutter flap in this bypass air stream leads to a large amount of head loss, thereby increasing fuel consumption, which is not acceptable.

It is also known to mount a thermostatic valve in a parallel-connected pipe at the inlet to the heat exchanger. When the valve is in the closed state, the entire flow of oil passes through the oil/air heat exchanger, and when the valve is in the open state, the flow of oil is shared between the oil/air heat exchanger and the parallel-connected pipe. In an embodiment, the valve contains wax, which is in the solid state at low temperature. Thus, when the temperature of the oil increases, the wax liquefies and causes the valve to close, and when the temperature decreases once more, the wax re-solidifies and the valve opens. The composition of the wax determines the opening/closing temperature of the valve.

That type of configuration does not make it possible to stop the flow of oil through the oil/air heat exchanger completely. Furthermore, such a valve cannot tolerate a large number of opening/closing cycles. Thus, in order to limit the number of opening/closing cycles of the valve, it is operated in such a manner as to remain closed during all stages of operation, with the exception of a stage in which the temperature of the oil is the lowest, corresponding to outside conditions that are extremely cold. Nevertheless, it is found that for intermediate temperatures where the oil is considered as being cold, the valve is closed and the oil cools, so its temperature can drop below the acceptable threshold at which oil is observed to be retained in the enclosures of the turbine engine. If the opening/closing threshold temperature of the valve is increased, that also increases the number of opening/closing cycles, since there are numerous stages of flight in which the fuel can cool or heat the oil through the oil/fuel heat exchanger sufficiently to cause the oil to reach the threshold temperature. That has the consequence of reducing the reliability of the valve.

Finally, it is also known to arrange a hydraulic valve in a pipe connected in parallel with the oil/air heat exchanger, that valve being designed to open the parallel pipe for a given threshold pressure difference corresponding to a given head loss in the oil/air heat exchanger.

Both with that solution, and with the solution involving a thermostatic valve, some of the flow of oil does not pass through the parallel-connected pipe when the valve is open, which contributes to the oil in the oil circuit being cooled continuously to a greater or lesser extent during all stages of operation. Furthermore, in order to ensure a parallel flow of fluid at intermediate temperatures, it is necessary for the pressure threshold to be relatively high, which causes the valve to take on an open position during numerous operating conditions.

When the increase in pressure is due to a large flow of oil or to a low oil temperature leading to increased oil viscosity, and thus to an increase in pressure upstream from the oil/air heat exchanger, opening the valve leads to a drop in the head loss through the oil/air heat exchanger, and that can cause the valve to re-close. This can lead to the operation of the valve being unstable, thus making it impossible to use the valve for reliable control of the parallel flow of oil.

Patent applications FR 2 951 228, FR 1 061 138 and FR 1 157 953 in the name of the Applicant describe architectures for oil and fuel circuits in a turbine engine.

BRIEF SUMMARY OF THE INVENTION

A particular object of the invention is to provide a solution that is simple, inexpensive, and effective to the above-mentioned problems, making it possible to avoid the drawbacks of prior art solutions.

For this purpose, the invention proposes a device for controlling the feed of fluid to equipment, such as a heat exchanger, the device comprising a fluid slide valve mounted in a fluid circuit and including a slide movable between two positions, a first position in which it allows the fluid to flow through the equipment, and a second position in which it prevents the fluid from flowing through the equipment, the device being characterized in that a laminar flow constriction is arranged in the fluid circuit upstream from the slide valve, and in that it includes drive means for moving the slide of the slide valve between its two positions by means of the head loss of the fluid in the laminar flow constriction.

In the invention, the flow rate of oil passing through the equipment can be stopped, thereby preventing the oil from being cooled under cold operating conditions when it is desired that the oil is not cooled. Furthermore, the movement of the slide is controlled by a head loss, i.e. by a pressure difference, between the upstream and downstream ends of a laminar constriction arranged upstream from the slide valve, and through which the entire flow of fluid passes, thereby making the positioning of the slide insensitive to head losses in the equipment, unlike the prior art making use of a hydraulic valve.

The use of a constriction under laminar conditions enables the head loss measured between the inlet and the outlet of the constriction to depend both on the flow rate of the fluid and on the temperature of the fluid, unlike a constriction operating under turbulent conditions in which head loss depends on flow rate only.

Under cold conditions, the low temperature of the fluid passing through the laminar constriction leads to a large head loss, thereby enabling the slide to be positioned in its second position, and thus preventing the fluid from flowing through the equipment.

Increasing the temperature of the fluid leads to a drop in the head loss through the laminar constriction and thus to the slide being positioned in its first position in which it allows the fluid to flow through the equipment.

Likewise, in the event of an increase in the oil flow rate, the head loss in the laminar constriction increases, thereby enabling the slide to be caused to pass into its second position.

When the slide is in its second position, the flow of fluid may be established in a parallel-connected pipe bypassing the equipment.

In an embodiment of the invention, the drive means comprise two chambers separated by the slide, one of the chambers being in fluid flow communication with the inlet to the laminar constriction, and the other chamber being in fluid flow communication with the outlet from the fluid flow constriction, the drive means further comprising return means designed and configured to bring the slide into its first position when the pressure difference between the inlet and the outlet of the laminar constriction is less than a predetermined threshold.

In this embodiment, the head loss in the laminar constriction directly controls the movement of the slide by using return means that are calibrated to determine the head loss threshold from which the slide switches between the first and second positions.

Advantageously, the slide valve includes at least one fluid outlet connected to a parallel pipe in parallel with the equipment, the slide of the slide valve allowing fluid to flow to the parallel pipe when the slide is in its second position, and preventing fluid from flowing in the parallel pipe when the slide is in its first position.

This parallel pipe enables other pieces of equipment to continue to be fed with the fluid when the slide prevents fluid from flowing through the above-mentioned equipment.

In practice, the slide valve thus has first and second outlets, the first outlet serving to feed the equipment with fluid when the slide is in its first position, and the second outlet serving to cause the fluid to bypass the equipment via the parallel pipe when the slide is in its second position.

According to another characteristic of the invention, the parallel pipe is incorporated in a support of the equipment and extends at least in part in the immediate proximity of the equipment in order to transmit heat between the parallel pipe and the equipment through the support.

This arrangement is particularly advantageous when the fluid is air and the piece of equipment is an oil/air heat exchanger. Specifically, when the slide is in its second position, the parallel pipe enables the oil present in the oil/air heat exchanger to be heated by conduction, thus preventing stagnant oil cooled by the air from forming a plug that could shut off the oil/air heat exchanger and block the flow of oil when the slide is subsequently moved into its first position.

According to another characteristic of the invention, the device includes a pressure release valve mounted in a channel connecting the upstream end of the slide valve to the downstream end of the equipment, the release valve being configured to allow fluid to flow in the channel when the head loss in the equipment is greater than a predetermined threshold.

Thus, in the event of the slide becoming jammed, e.g. by seizing or in the event of the flow of fluid through the equipment being obstructed by the formation of a plug of cold oil or of polluting elements, for example, the pressure release valve ensures continuity of fluid flow downstream from the piece of equipment.

In a particular embodiment of the invention, the return means of the slide comprise a compression spring arranged in the chamber that is connected to the outlet of the laminar constriction, between a face of the slide and an end wall of said chamber.

Advantageously, the laminar constriction is formed by a tube having an inside surface that is rough so as to increase friction for the peripheral layers of fluid flowing in laminar manner against the inside wall of the tube.

The inside surface of the tube ideally possesses roughness defined by a coefficient $R_a$ of about 15 micrometers (urn), with an accuracy of ±5%. It should be observed that specifying a value for $R_a$ alone is considered as being sufficient in the state of the art to specify the roughness of a pipe.

Advantageously, the laminar constriction is formed by a tube having a length greater than its diameter.

By way of example, the tube may have a length of about 30 centimeters (cm) with an accuracy of ±1.5%, and a diameter of about 8.15 millimeters (mm), with an accuracy of ±1.5%.

Increasing the roughness of the inside surface of the tube and/or increasing in particular the length dimension of the tube make it possible to generate greater friction within the laminar flow of fluid, thereby increasing head loss through the laminar constriction, in particular when the fluid presents high viscosity.

The invention also provides a turbine engine, such as an airplane turboprop or turbojet, including at least one device as described above, and wherein the fluid is oil and the equipment is an oil/air heat exchanger connected upstream from an oil/fuel heat exchanger.

BRIEF DESCRIPTION OF THE SEVERAL VIEWS OF THE DRAWINGS

Other details, characteristics, and advantages of the invention appear on reading the following description made by way of nonlimiting example and with reference to the accompanying drawings, in which.

DETAILED DESCRIPTION OF THE INVENTION

Figure 1:
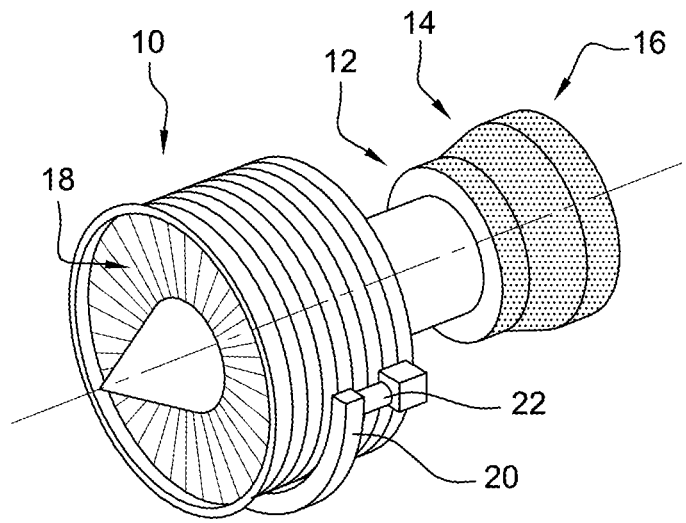
FIG. 1 is a diagrammatic perspective view of a turbine engine of known type.

In well-known manner to the person skilled in the art, a turbine engine 10 comprises a combustion chamber 12, with the combustion gas from the chamber 12 driving a high-pressure turbine 14 and a low-pressure turbine 16. The high-pressure turbine 14 is coupled by a shaft to a high-pressure compressor arranged upstream from the combustion chamber 12 and feeding the combustion chamber with air under pressure. The low-pressure turbine 16 is coupled by another shaft to a fan wheel 18 arranged at the upstream end of the turbine engine 10.

An accessory gearbox (AGB) 20 is connected by a mechanical power takeoff 22 to the high-pressure turbine shaft and has a set of gearwheels for driving various pieces of equipment in the turbine engine, such as pumps and generators, in particular electricity generators.

Figure 2:
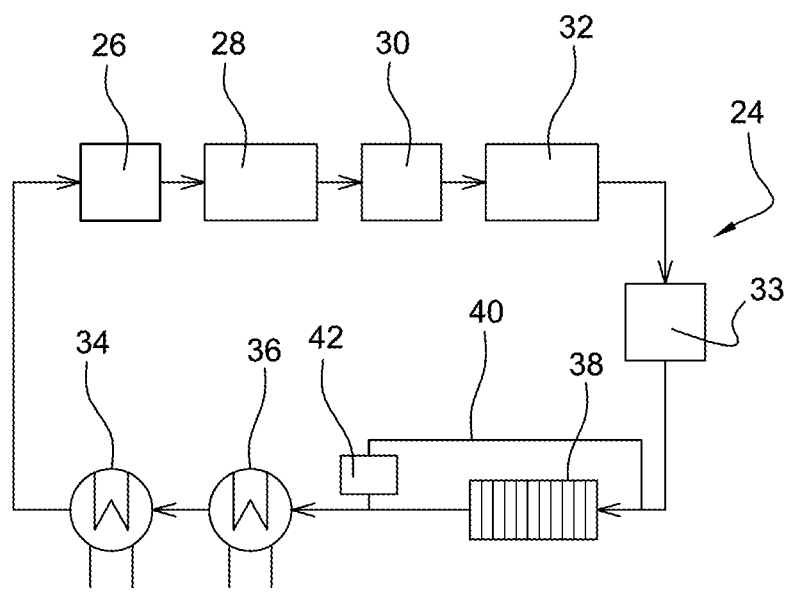
FIG. 2 is a fragmentary diagrammatic representation of an oil circuit of the prior art.

FIG. 2 shows an oil circuit of the FIG. 1 turbine engine.

From upstream to downstream in the oil flow direction, the oil circuit 24 comprises various assemblies 26 making use of lubricating and/or cooling oil: recovery pumps 28 serving to recirculate the oil from the equipment to a tank 30; feed pumps 32; and a filter 33.

In addition to the oil used for lubricating and cooling the turbine engine, in particular bearings of turbine and compressor shafts, the overall flow of oil may include oil that is used for lubricating the AGB 20 and for lubricating and cooling one or more electricity generators.

The oil circuit has three heat exchangers connected in series between the filter 33 and the assembly 26, namely: a main oil/fuel heat exchanger 34, a secondary oil/fuel heat exchanger 36, and an oil/air heat exchanger 38.

Thus, in operation, at the outlet from the feed pumps 32, the oil passes through the oil/air heat exchanger 38, the secondary oil/fuel heat exchanger 36, and then the main oil/fuel heat exchanger 34. A pipe 40 is installed in the oil circuit as a parallel connection around the oil/air heat exchanger 38; it has an inlet as a branch connection between the outlet of the filter 33 and the inlet of the oil/air heat exchanger 38, and an outlet as a branch connection between the outlet of the oil/air heat exchanger 38 and the inlet of the secondary oil/fuel heat exchanger 36. A hydraulic valve 42 is connected in the parallel pipe and causes the flow of oil to pass through the oil/air heat exchanger 38 or to pass through the parallel pipe 40 and the oil/air heat exchanger 38. The oil leaving the main oil/fuel heat exchanger 34 then flows towards the oil tank 30.

The oil/air heat exchanger 38 may be of the surface cooling type, i.e. of the type having oil ducts swept by a stream of cold air coming from a stream of air bypassing the turbojet, which may also be referred to as the "secondary" air stream. By way of example, such a heat exchanger may be housed on a wall of the passage for the bypass stream, immediately downstream from the fan 18 (FIG. 1).

The oil/air heat exchanger 38 may also be of the air/oil plate type, having passing therethrough a stream of air taken from the bypass air stream and reinjected into the bypass stream at the outlet from the heat exchanger.

As mentioned above, during cold operating conditions, the valve opens to allow oil to pass through the parallel pipe 40. Nevertheless, the oil/air heat exchanger 38 continues to be fed with oil, thereby contributing to further cool the oil. Furthermore, that type of valve may operate in unstable manner, as mentioned above.

The invention provides a solution to those problems and also to the other problems mentioned above, by incorporating a laminar constriction 44 upstream from a member 46 for distributing fluid to the oil/air heat exchanger 48, and by causing the supply of oil to the oil/air heat exchanger to be opened or closed by means of the head loss in the laminar constriction, with this head loss depending on the flow rate and on the temperature of the oil.

Figure 3:
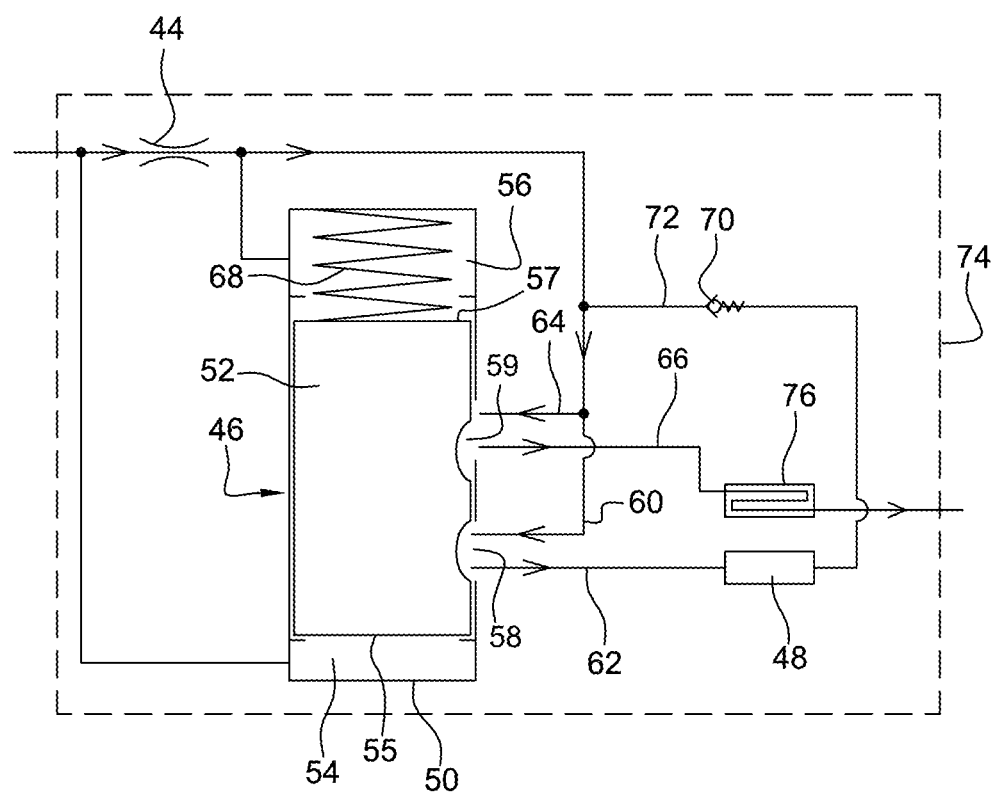
FIG. 3 is a diagrammatic representation of a device of the invention.

FIG. 3 shows a device for controlling the supply of fluid to the oil/air heat exchanger in accordance with the invention.

The device comprises a slide valve 46 having a hollow body 50, such as a cylinder, slidably receiving a slider 52 hermetically separating a first chamber 54 from a second chamber 56. The inlet to the laminar constriction 44 is in fluid flow communication with the first chamber 54, and its outlet is in fluid flow communication with the second chamber 56, which second chamber is at the opposite end of the slide 52 relative to the first chamber 54.

The slide 52 has two recesses or slots 58 and 59 that are axially spaced apart from each other along the travel axis of the slide 52. A first recess 58 of the slide 52 is for connecting together a first inlet pipe 60 and a first outlet pipe 62. The second recess 59 is for connecting together a second inlet pipe 64 and a second outlet pipe 66.

The oil/air heat exchanger 48 is connected in the first outlet pipe 62 from the slide valve 46. The second outlet pipe 66 forms a parallel pipe around the oil/air heat exchanger 48, opening out downstream from the oil/air heat exchanger 48.

The width of each recess 56, 59 is determined so as to allow oil to flow between the associated inlet and outlet pipes 60, 64 and 62, 66. Also, the spacing between the recesses 58 and 59 of the slide is determined in such a manner that, in a first position (FIG. 3), the first inlet pipe communicates via the first recess 58 with the first outlet pipe 62, and fluid flow communication between the second inlet pipe 64 and the second outlet pipe or parallel pipe 66 is blocked by a wall of the slide 52, and in such a manner that, in a second position, the second inlet pipe 64 communicates via the second recess 59 with the second outlet pipe or parallel pipe 66, and fluid flow communication between the first inlet pipe 60 and the first outlet pipe 62 is blocked by a wall of the slide 52.

A compression spring 68 is mounted in the second chamber 56 connected to the outlet of the laminar constriction 44 between a face of the slide 52 and an end wall of the second chamber 56 in such a manner as to exert a force urging the slide 52 in the direction that increases the volume of the second chamber 56.

The compression of the spring 68 is determined so as to allow the slide to move in its first position when the pressure difference between the inlet and the outlet of the laminar constriction is less than a predetermined threshold. When the pressure difference between the inlet and the outlet of the laminar constriction 44 is greater than the threshold, then the sum of the forces exerted by the spring on the slide and by the oil in the second chamber 56 becomes less than the force exerted by the oil in the first chamber 54, thereby moving the slide 52 into its second position.

It can thus be understood that the pressure difference at which it is desired for the slide to switch from its first position to its second position is determined by calibrating the force of the spring and also by the surface areas 55 and 57 of the slide 52 against which the oil pressure acts.

The device also has a pressure release valve 70 mounted in a channel 72 connecting the upstream end of the slide valve 46 to the downstream end of the oil/fuel heat exchanger 48. The release valve 70 is configured to allow fluid to flow in the channel 72 when the pressure upstream from the valve 70 is greater than a predetermined threshold. This threshold may be reached in the event of the slide 52 becoming blocked, e.g. by seizing, or in the event of a viscous plug of cold oil forming in the oil/air heat exchanger 48.

The entire device of the invention can be incorporated in a casing 74. To do this, the parallel pipe 66 and the oil/air heat exchanger 48 are incorporated in the casing 74.

The parallel pipe 66 of the oil/air heat exchanger includes at least a portion 76 that extends in the immediate proximity of the oil/air heat exchanger 48 in order to enable heat to be exchanged by thermal conduction through the material of the casing.

When the slide 52 is in its second position preventing oil from flowing towards the oil/air heat exchanger 48, the oil present in the oil/air heat exchanger continues to be cooled by the air and can form a plug of oil that blocks the flow of oil in the oil/air heat exchanger 48 when the slide 52 is switched into its first position. The pipe 76 formed in the immediate proximity of the oil/air heat exchanger 48 serves to heat the stagnant oil in the oil/air heat exchanger 48.

By way of example, the device of the invention is incorporated in the oil circuit of FIG. 2 between the outlet from the filter 33 and the inlet to the secondary oil/fuel heat exchanger 36, and it replaces the oil/air heat exchanger 38, the parallel pipe 40, and the valve 42 as described with reference to FIG. 2.

The use of a laminar constriction 44 upstream from the slide valve enables the head loss in the constriction 44 to depend both on the flow rate of oil in the constriction and on the temperature of the oil.

The flow rate is given by the following relationship:

$$Q = ks \times \sqrt{\frac{\Delta P}{\rho}}$$

where:
Q represents the flow rate through the laminar constriction 44 in liters per hour (L/h);
ks represents the head loss coefficient of the constriction 44 and depends on the surface state and on the shape (length, diameter) of the laminar constriction 44. This coefficient is determined empirically;
$\Delta P$ represents the head loss between the inlet and the outlet of the laminar constriction 44 in bars; and
$\rho$ represents the density of the oil in kilograms per liter (kg/L).

The density $\rho$ depends on the temperature of the oil and it increases when the temperature decreases.

It can be understood that in order to reach a given head loss in the laminar constriction, it suffices to have a laminar constriction with a coefficient ks that is appropriate, and to do this, it suffices to make a laminar constriction having appropriate geometrical characteristics (length, diameter) and an appropriate surface state.

In a particular embodiment of the invention, the laminar constriction 44 is formed by a tube having a rough inside surface so as to generate head loss by friction in the laminar constriction 44. A tube with this design makes it possible in particular to enhance the friction of the peripheral layers of the fluid against the inside wall of the tube, thereby increasing the head loss through the laminar constriction, in particular when the fluid presents high viscosity.

In practice, the tube may have a length of about 30 cm and a diameter of about 2 cm.

While the turbine engine is operating cold, and since the density of oil is greater when cold than when hot, there is an increase in the pressure difference across the ends of the laminar constriction 44, thereby causing the slide 52 to move into its second position, in which it prevents oil from flowing to the oil/air heat exchanger 48. This avoids cooling the oil that is used for heating fuel via the main and secondary oil/fuel heat exchangers 34 and 36.

When the temperature of the oil increases, the pressure difference in the laminar constriction 44 decreases, thereby acting, at a threshold pressure difference value, to cause the slide 52 to move into its first position in which it allows oil to flow through the oil/air heat exchanger 48.

During a take off stage, the flow of oil through the constriction 44 increases strongly, thereby leading to a new increase in the head loss through the laminar constriction 44, and causing the slide 52 to move into its second position. The device of the invention is calibrated in such a manner that for a take off in cold weather the slide 52 is in its second position, and for a take off in hot weather the slide 52 is in its first position.

While cruising, when the outside temperature is cold, the slide is maintained in its second position because of the low temperature of the oil.

The laminar constriction 44 introduces additional head loss in the oil circuit that it is desirable to minimize. To do this, it is preferable to have large surface areas against which pressure is applied at each end of the slide 52 so that the pressure difference across the terminals of the laminar constriction 44 gives rise to a clear difference in the force applied to the slide 52. Nevertheless, the overall size of the slide valve 46 must not be excessive in order to avoid significantly increasing the weight of the device 74.

The slide valve described with reference to FIG. 3 has two positions for the slide 52 and four fluid flow ports. The slide valve could also have two positions for the slide 52 and three fluid flow ports, comprising one oil inlet and two oil outlets, the oil inlet feeding one or the other of the oil outlets selectively depending on the position of the slide. Such a three-port slide valve presents a transition zone for switching the flow of oil into the parallel pipe 66 or to the oil/air heat exchanger 48, and it presents dynamic behavior that is not as good as a four-port slide valve having two inlets and two outlets dedicated to the flow of fluid to the oil/air heat exchanger 48 and in the parallel pipe 66.

In a variant of the invention, the spring could be arranged in the first chamber 54 and configured so as to work in traction, thereby enabling the slide to be moved in identical manner to that described above.

In another variant of the invention, the first and second chambers 54 and 56 of the slide valve 46 could be in fluid flow communication with a component that is already present in the oil circuit upstream from the device 74 and acting as a laminar constriction.

The device of the invention could be used in the same manner with a heat exchanger making use of a pair of fluids other than oil and air. It is thus possible to use the device of the invention with an oil/fuel heat exchanger or with an air/fuel heat exchanger. When used with an oil/fuel heat exchanger, the fluid could be fuel that is diverted into a parallel pipe by the head loss of fuel in a laminar constriction in a manner similar to that described above.

The invention claimed is:

1. A device for controlling a feed of fluid to a heat exchanger, the device comprising:
a fluid slide valve mounted in a fluid circuit and including a slide movable between first and second positions, the first position in which the slide allows a fluid to flow through the heat exchanger, and the second position in which the slide prevents the fluid from flowing through the heat exchanger;
a laminar flow constriction arranged in the fluid circuit upstream from the slide valve; and
a drive means for moving the slide of the slide valve between the first and second positions by head loss of the fluid in the laminar flow constriction,
wherein the drive means comprises first and second chambers separated by the slide, the first chamber being in fluid flow communication with an inlet to the laminar constriction, and the second chamber being in fluid flow communication with an outlet from the fluid flow constriction,
wherein the drive means further comprises return means configured to bring the slide into the first position when a pressure difference between the inlet and the outlet of the laminar constriction is less than a predetermined threshold,
wherein the slide valve includes at least one fluid outlet connected to a parallel pipe in parallel with the heat exchanger, the slide of the slide valve allowing fluid to flow to the parallel pipe when the slide is in the second position, and preventing fluid from flowing in the parallel pipe when the slide is in the first position, and
wherein the parallel pipe is incorporated in a support of the heat exchanger and extends at least in part in immediate proximity of the heat exchanger to transmit heat between the parallel pipe and the heat exchanger through the support.

2. A device according to claim 1, wherein the return means of the slide comprises a compression spring arranged in the chamber that is connected to the outlet of the laminar constriction, between a face of the slide and an end wall of the chamber.

3. A device according to claim 1, further comprising a pressure release valve mounted in a channel connecting an upstream end of the slide valve to a downstream end of the heat exchanger, the release valve being configured to allow fluid to flow in the channel when a head loss in the heat exchanger is greater than a predetermined threshold.

4. A device according to claim 1, wherein the laminar constriction includes a tube.

5. A device according to claim 4, wherein an inside surface of the tube possesses a surface roughness defined by a coefficient $R_a$ of about 15 μm, with an accuracy of ±5%.

6. A device according to claim 1, wherein the laminar constriction includes a tube in which a length of the tube is greater than a diameter of the tube.

7. A device according to claim 6, wherein the tube has a length of about 30 cm with an accuracy of ±1.5%, and a diameter of about 8.15 mm, with an accuracy of ±1.5%.

8. A turbine engine, or an airplane turboprop or turbojet, comprising at least one device according to claim 1.

9. A turbine engine according to claim 8, wherein the fluid is oil and the heat exchanger is an oil/air heat exchanger connected upstream from an oil/fuel heat exchanger.

10. A device for controlling a feed of fluid to a heat exchanger, the device comprising:
a fluid slide valve mounted in a fluid circuit and including a slide movable between first and second positions, the first position in which the slide allows a fluid to flow through the heat exchanger, and the second position in which the slide prevents the fluid from flowing through the heat exchanger;
a laminar flow constriction arranged in the fluid circuit upstream from the slide valve; and
a drive means for moving the slide of the slide valve between the first and second positions by head loss of the fluid in the laminar flow constriction,
wherein the laminar constriction includes a tube, and
wherein an inside surface of the tube possesses a surface roughness defined by a coefficient $R_a$ of about 15 μm, with an accuracy of ±5%.

* * * * *

UNITED STATES PATENT AND TRADEMARK OFFICE
CERTIFICATE OF CORRECTION

PATENT NO. : 10,018,117 B2  
APPLICATION NO. : 14/404151  
DATED : July 10, 2018  
INVENTOR(S) : Lauranne Sophie Mottet et al.

Page 1 of 1

It is certified that error appears in the above-identified patent and that said Letters Patent is hereby corrected as shown below:

In the Specification

Column 6, Line 33, change "recess 56, 59" to --recess 58, 59--.

Signed and Sealed this  
Thirtieth Day of July, 2019

Andrei Iancu  
*Director of the United States Patent and Trademark Office*